April 20, 1948.     E. K. CLARK     2,440,041
ELECTRIC FLATIRON
Filed March 24, 1945     3 Sheets-Sheet 1

WITNESSES:

INVENTOR
EARL K. CLARK.
BY
ATTORNEY

April 20, 1948.  E. K. CLARK  2,440,041
ELECTRIC FLATIRON
Filed March 24, 1945   3 Sheets-Sheet 3

OVER TEMPERATURE
LIGHT CONTACTS

HEATING ELEMENT
CONTACTS

WITNESSES:
E. H. Lutz
E. A. Demsky

INVENTOR
EARL K. CLARK
BY R. J. Eisinger
ATTORNEY

Patented Apr. 20, 1948

2,440,041

UNITED STATES PATENT OFFICE 2,440,041

ELECTRIC FLATIRON

Earl K. Clark Mansfield, Ohio, assignor to Westinghouse Electric Corporation, East Pittsburgh, Pa., a corporation of Pennsylvania Application March 24, 1945, Serial No. 584,539

7 Claims. (Cl. 219—25)

This application is a continuation-in-part of my application, Serial No. 436,300, filed March 26, 1942, now abandoned.

Flatirons have heretofore been provided with lights at their front ends which may be referred to as headlights for illuminating the material to be ironed. Such lights have usually been connected into the electrical circuit of the iron so as to be energized continuously as long as the iron is connected to a source of electrical energy. Furthermore, irons have been provided with small indicating lights which are illuminated while the element is being heated, but such indicating lights give no indication of whether or not the iron is in the proper condition for ironing. In other words, such indicating lights may be on when the iron is too cool or too hot for ironing, and on or off when the iron is at correct temperature. Such indicating lights of the prior art have usually been located on the top surface of the body of the iron and do not serve to illuminate the material to be ironed.

In my copending application, Serial No. 426,209, filed January 9, 1942, I have disclosed and claimed a form of indicating system in which the indicating light is illuminated whenever the iron is at correct ironing temperature and is extinguished on other occasions. The periods of illumination of the light have little or no relation to periods when the iron is being heated.

In a second form of indicating system, the indicating light is illuminated whenever the cord of the iron is plugged in and the iron is not too hot, and the light is extinguished when the temperature of the iron is above the upper limit of the temperature range for which the thermostat is set. In this form, the light does not indicate, on initial heating up, when the proper temperature range has been reached, but instead it indicates that the cord has been plugged in. This form of the invention retains the more important indicating function of indicating over-temperature. Such condition is encountered when the iron has been used at a relatively high temperature and then adjusted for use at a lower temperature. For example, when ironing linens, a relatively high temperature is used. If the user then wishes to iron rayons, the thermostat is adjusted for a lower temperature. However, the iron is still at high temperature from the previous setting and would scorch a rayon article if used immediately. In this form of indicating system, as well as in the first, the light is extinguished when the thermostat is adjusted to a lower temperature while the iron is still at a higher temperature, and the light is again illuminated only when the iron has cooled to a temperature suitable for ironing at the new setting.

I have now conceived of employing a single lamp as both a headlight and an indicating light, which will make electric flatirons more usable in that, whenever the headlight is on, the user knows that the iron may be safely used without danger of scorching. In the one case, the user knows that the temperature is correct for ironing, while in the second case the user knows merely that it is not too hot for ironing. In both cases, the user knows that, when the headlight is off, the iron should not be used for ironing.

I accomplish this by providing a light of such a character and so arranged as to illuminate the material being ironed and a signal control device for the lamp. According to the first form, the control device turns the light on as long as the temperature of the iron is within the limits or the range suitable for ironing, regardless of whether or not the heating element is turned on or off, and it turns the light off when the temperature of the iron is below or above said limits or temperature range. According to the second form, the control device turns the light on as long as the temperature of the iron is below the upper limit of the temperature range suitable for ironing, regardless of whether the heating element is turned on or off, and it turns the light off when the temperature of the iron is above the upper limit of the temperature range.

A flatiron incorporating this invention has several advantages. Since a single light serves the two functions of illumination and signalling, the construction of an iron providing these two functions is simplified. Likewise, the use of the iron is simplified. If the user has light for illuminating the material to be ironed, he or she knows that the iron may be safely used for ironing without danger of scorching; and in the case of the first form, also that the iron is sufficiently hot for ironing. Furthermore, since the light plays an important part in the use of the iron, the fact that the iron is or is not at a temperature at which it may be safely used is more forcibly brought to the attention of the user. A further advantage is that the cost of maintenance is reduced, since there is but one light bulb to be replaced.

These and other advantages are effected by my invention as will be apparent from the following description and claims taken in connection with the accompanying drawings, forming a part of this application, in which:

Figure 1:
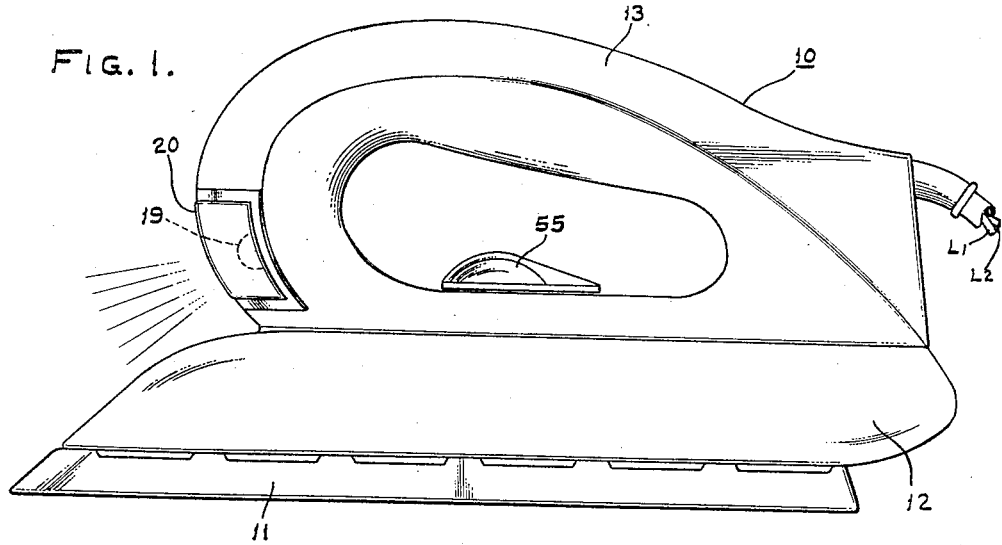
Fig. 1 is a side elevational view of an electrically heated flatiron in which the present invention has been incorporated.

Referring to the drawings, there is illustrated an electrically heated flatiron generally indicated 10 which comprises an electrically heated soleplate 11, a cover 12, and a handle 13. The soleplate may be heated in any suitable manner, as by a resistance element clamped thereto or preferably by an armored resistance element cast or embedded therein. The resistance element which heats the soleplate is schematically indicated at 14 in Fig. 3.

Energization of the resistance element 14 is controlled by means of an adjustable thermostat, generally indicated 15. The thermostat is preferably supported within a suitable recess in the soleplate 11, in a manner well known in the art, with its heat-responsive bimetal element 17 mounted closely adjacent the upper surface of the soleplate so that the bimetal element will be responsive to the temperature of the soleplate.

The thermostat 15 controls a circuit (Fig. 3) for the heating element 14 and also controls a second circuit (Fig. 3) in such a manner that an incandescent lamp 19 or the like in this second circuit indicates to the user of the iron when the iron is ready for use.

This lamp, as shown in Fig. 1, is preferably mounted within the front support of the handle 13 in a position to direct the light therefrom over the toe of the iron onto the material being pressed. The lamp will preferably be mounted behind a transparent window 20 fitting in the front support of the handle and provided with a suitable reflector 21, shown diagrammatically in Fig. 3, for directing the light rays to the material being pressed. The lamp 19 therefore serves the dual function of indicating to the operator when the iron is ready for use and also providing illumination of the material being pressed.

Figure 2:
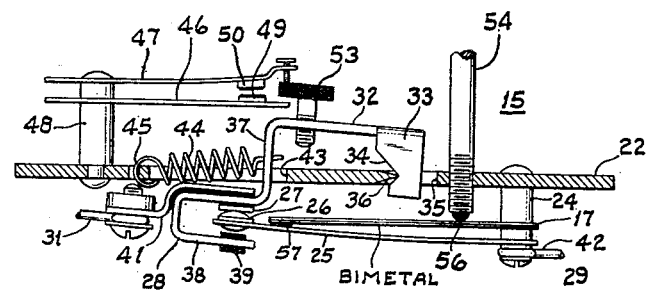
Fig. 2 is a side elevational view of the thermostat employed in the iron illustrated in Fig. 1 and showing the relation of the movable parts thereof when the iron is below its set temperature range.
Figure 3:
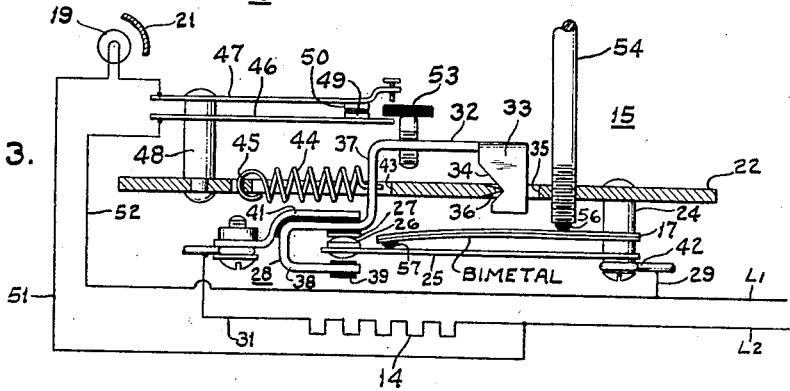
Fig. 3 is a view similar to Fig. 2 and includes a wiring diagram of the electrical circuits employed in the iron illustrated in Fig. 1, the movable parts of the thermostat being shown in the position they assume just prior to the time the thermostat reaches its switch-opening temperature.

The thermostat illustrated in Figs. 2 and 3 may be identical with that disclosed in my copending application, Serial No. 426,209, filed January 9, 1942, or like that disclosed in my Patent No. 2,409,420, issued October 15, 1946, both of which are assigned to the assignee of the present application, although it is to be understood that the present invention is not limited to the use of these particular thermostats.

The thermostat 15 includes a supporting plate or base 22 which is secured to the soleplate 11. The plate 22 is provided with a depending post 24, adjacent its rear end, to which one end of the bimetal strip 17 is secured. This post also carries a spring, contact-carrying arm 25 which is normally self-biased or sprung upwardly as shown in Fig. 2. The bimetal strip 17 and the arm 25 are preferably insulatedly mounted on the post 24 with the bimetal strip arranged to bow downwardly toward the arm when heated.

A contact 26 carried on the free end of the spring arm 25 is adapted to engage a cooperating contact 27 insulatedly carried by a pivoted contact frame 28. These contacts, when closed, complete the energizing circuit (Fig. 3) for the heating element 14. This circuit is traceable from one line conductor L1, conductor 29, through arm 25, closed contacts 26—27, conductor 31, heating element 14 to the other line conductor L2.

The contact frame 28 comprises an irregularly-shaped rigid member which includes a horizontal portion 32 disposed above the base 22 and provided with a pair of opposed depending flanges 33, only one of which is visible in the drawings. These flanges have aligned V-shaped notches 34 therein. The flanges are receivable in an aperture 35 formed in the plate 22. The edge of the plate 22, at this aperture, which faces the notches 34 in the flanges 33, is preferably beveled to provide fulcrum or pivot points 36, receivable in the notches so that the contact frame 28 is free to rock on the plate 22.

A vertical portion 37 of the frame 28, extending downwardly from the forward or left end of the horizontal portion 32, terminates in a U-shaped portion 38 which insulatedly carries the mentioned contact 27 in the upper arm thereof. The lower arm of this U-shaped portion carries an adjustable insulating button or stop 39. The spacing between the top of this button 39 and the contact 27 is preferably such as to provide a clearance for the movable contact 26 carried by the arm 25 of the order of between .005 and .010 inch. The contact 27 may be provided with a terminal arm 41, insulated from the frame 28, while a terminal 42 may be connected to the fixed end of the spring arm 25, for connection to the conductors 31 and 29, respectively, in the circuit of Fig. 3.

The vertical portion 37 of the contact frame 28 extends through an opening 43 formed in the base 22 and has connected thereto one end of a tension spring 44, the other end of this spring being anchored to the base as indicated at 45. The spring 44 normally maintains the contact frame 28 in the position shown in Fig. 3.

A pair of spring, contact-carrying arms 46 and 47 are insulatedly fixed to the base 22 as by means of a supporting post 48. Contacts 49 and 50 carried by the arms 46 and 47, respectively, control a circuit (Fig. 3) for the combined signal and illuminating lamp 19. This circuit is traceable from one line conductor L2, conductor 51, lamp 19, arm 47, through contacts 50—49, when closed, arm 46, conductor 52 to the other line conductor L1.

A screw 53 adjustably threaded into the horizontal portion 32 of the contact frame 28 is positioned with the head thereof, which is made of nonconducting material, between the projecting free ends of the spring arms 46 and 47 so that when the contact frame 28 is materially above (Fig. 2) or below its normal position (Fig. 3), the screw head will engage one or the other of the arms 46 and 47 and separate the contacts 49 and 50 to interrupt the lamp circuit.

From the construction just described, it will be seen that the lamp circuit switch 49—50 will be closed only when the contact frame is in or near its normal position (Fig. 3).

The thermostat 15 is adjusted by means of a rod 54 which is threaded through the base 22 in alignment with the bimetal strip 17. The upper end of this rod has fixed thereto an operating knob 55 (Fig. 1) which may be provided with a suitable scale adapted to be read in conjunction with a suitable index provided on the iron adjacent the knob for selecting or setting the temperature at which it is desired to maintain the soleplate. This scale may be graduated in any desired manner to indicate the selected temperature either in degrees or types of material adapted to be ironed when the iron is at the selected or set temperature. It is, of course, not possible to maintain the soleplate at one particular temperature; in practice the temperature selected with the knob 55 represents a temperature range or zone lying between upper and lower temperature limits, the means of which is substantially the temperature indicated by the knob setting.

The lower end of the rod 54 carries a button 56, of insulating material, which is adapted to engage the bimetal strip 17 adjacent its fixed end so that on turning the knob 55 in one direction or the other, the bimetal strip will be moved closer to or further away from the spring arm 25 and thereby vary the temperature at which the bimetal 17 opens the switch 26—27.

The bimetal strip 17 is mounted on the post 24 so that an increase in temperature of the bimetal strip will cause it to bow downwardly. It will be understood that the rod 54 may be turned down sufficiently to maintain the contact 26 and 27 open and thereby provide an "off" position for the iron without the need of a separate line switch. When the iron is at room temperature and the thermostat-adjusting knob 55 is turned from its "off" position to a position to maintain the iron within a selected or set temperature range, the rod 54 is thereby raised, allowing the bimetal strip 17 to move upwardly in a direction away from the spring arm 25. Since the spring arm 25 is self-biased upwardly, under the condition just mentioned, this spring arm will also move upwardly and cause its contact 26 to engage the contact 27 carried by the contact frame 28 and raise the contact frame 28 to substantially the position shown in Fig. 2. With the contact frame in this position, the head of the adjusting screw 53 has raised the upper spring arm 47 and separated contacts 49 and 50 to interrupt the circuit for the lamp 19 while the contacts 26 and 27 are closed and complete the circuit for energizing the heating element 14.

As the temperature of the soleplate increases, the temperature of the bimetal strip 17 also increases and it begins to bow downwardly and eventually its free end, which may be provided with a spherical knob 57, of insulating material, engages the spring arm 25. Continued bowing of the bimetal strip forces the spring arm downwardly until it reaches the position shown in Fig. 3. The spring 44 causes the contact frame 28 to follow the spring 25 to maintain contacts 26 and 27 closed until this frame reaches its normal position (Fig. 3). When in this position, the contacts 49 and 50, which control the lamp circuit, have closed and further movement of the bimetal strip causes the contact 26 to move clear of the contact 27 and open the circuit for the heating element 14. From the above description, it will be seen that the lamp 19 is energized prior to the interruption of the circuit for the heating element 14, and that this last-mentioned circuit is interrupted when the thermostat reaches its set temperature.

After the heater circuit has been interrupted by opening of contacts 26 and 27, the soleplate and the bimetal strip begin to cool, allowing the bimetal strip to move upwardly so that these contacts will again close to energize the heating element 14 to maintain the soleplate within its set temperature range. It will be appreciated that when the soleplate is within its set temperature range the temperature of the thermostat varies between upper and lower limits which bear a definite relation to the upper and lower temperature limits of the soleplate and it cycles between "off" and "on" to open and close contacts 26 and 27 and intermittently energize the heater 14 to maintain the temperature of soleplate within that range.

The movement of the bimetal strip 17 during this cycling operation of the thermostat is sufficient to open and close contacts 26 and 27 but the clearance between the head of screw 53 and the projecting ends of the spring arms 46 and 47 is preferably such as to allow the contacts 49 and 50 to remain closed during such cycling of the thermostat so that the lamp 19 remains lit as long as the soleplate is within the set temperature range.

To change the set temperature of the iron from a previously high temperature to a lower temperature, as for example, when it is desired to iron with the soleplate at 250° F. and it is already at 350° F., the adjusting rod 54 is turned down causing the free end of the bimetal strip 17, which is already adjacent to the spring arm 25, to be flexed downwardly and move this arm so that its free end engages the insulating button 39 of the contact frame 28 and thereby swing the contact frame below its normal position (Fig. 3).

This movement of the contact frame 28 causes the head of the screw 53 to engage the free end of the lower spring arm 46 to pull it downwardly and open the contacts 49 and 50 and extinguish the lamp 19. With the lamp out, the operator knows that the iron is no longer at the temperature indicated by the scale on the thermostat adjusting knob 55. The mentioned movement of the spring arm 25 also opens the contacts 26 and 27 so that the circuit for the heating element 14 is interrupted and will remain open until the soleplate and the bimetal strip heated thereby have cooled sufficiently to allow the parts to move to the position shown in Fig. 3. As in the case where the iron is being brought up to heat, on allowing the iron to cool from a previous higher temperature to a new low temperature, the contacts 46 and 47 will close shortly prior to the time when the contact frame reaches its normal position.

Figure 4:
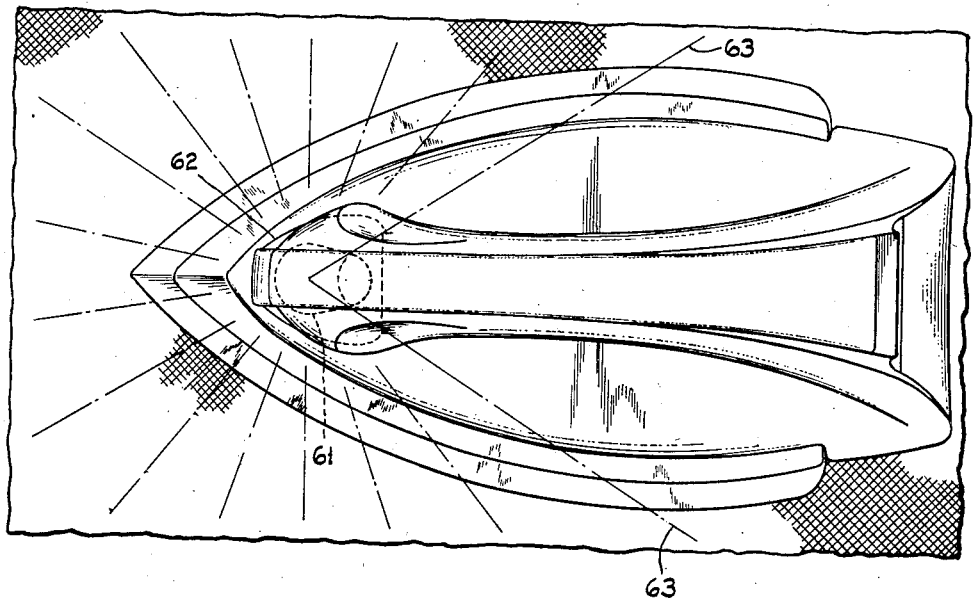
Figs. 4, 5 and 6 are plan, side elevational and front elevational views, respectively, of a flatiron having a somewhat modified form of combined headlight and signal light.
Figure 5:
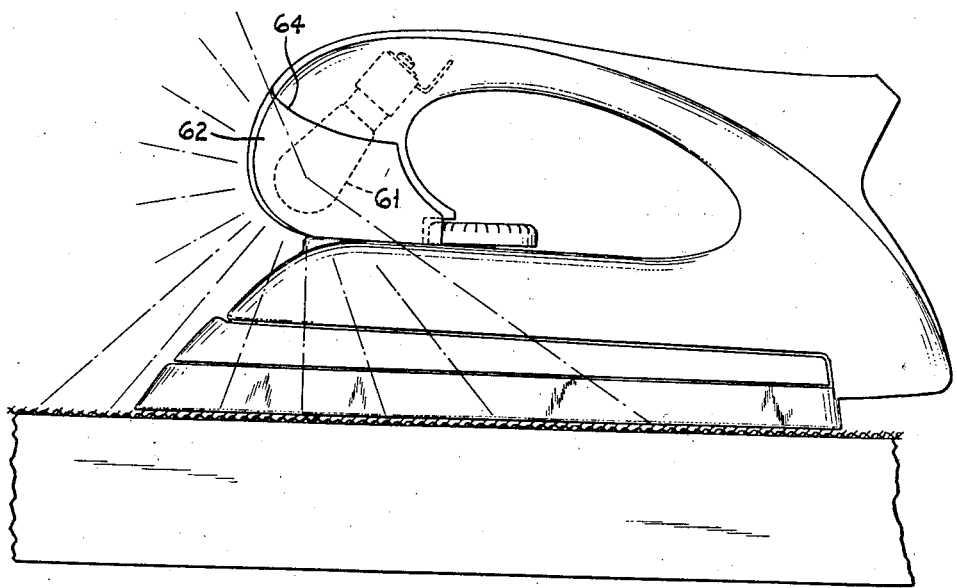
Figure 6:
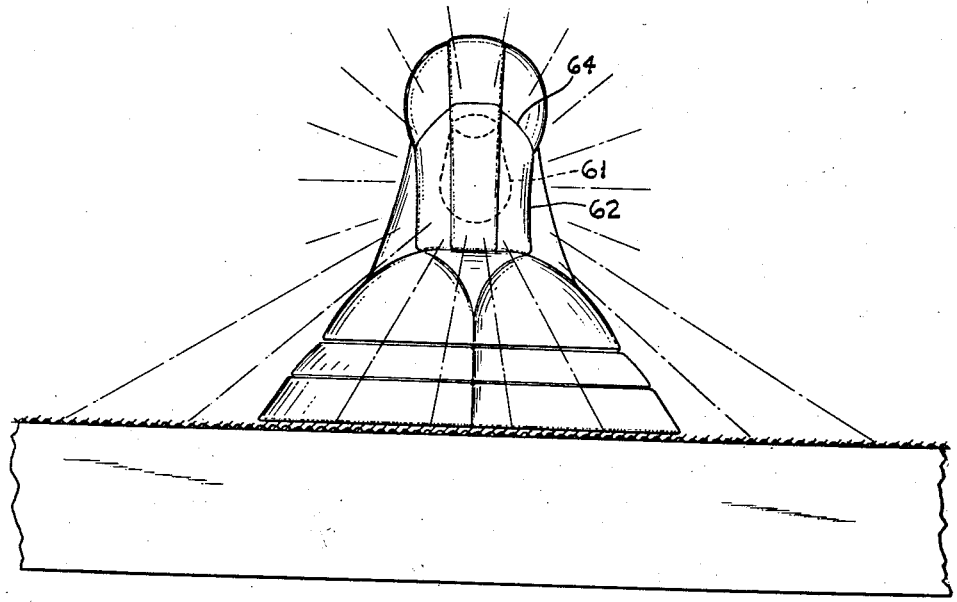

Figs. 4, 5 and 6 show a somewhat modified form of headlight, and these figures also show more fully how the light rays are directed onto the material being ironed. The lamp bulb is indicated at 61, and a transparent or translucent member 62 extends around the front and sides of the lamp bulb. As will be seen from these figures, the lamp bulb is disposed at the front of the iron and sufficiently high to direct its light rays above or exteriorly of the outer surfaces of the sides of the iron. Thus, the light rays are directed generally along or beyond the outer surfaces and are effective in adequately illuminating the material both in front of the iron and also on the opposite sides of at least the front half of the iron. The illumination extends either fully to or almost to the sides of the iron, although toward the rear end of the iron, the light rays may not reach fully to the edge of the iron. The lines 63 represent the approximate limits of the illumination toward the rear of the iron. It will be noted that the line of division between the upper part of the translucent member 62 and the opaque part of the handle, indicated at 64, is disposed to prevent light rays extending directly upwardly to produce glare in the eyes of the user.

Figure 7:
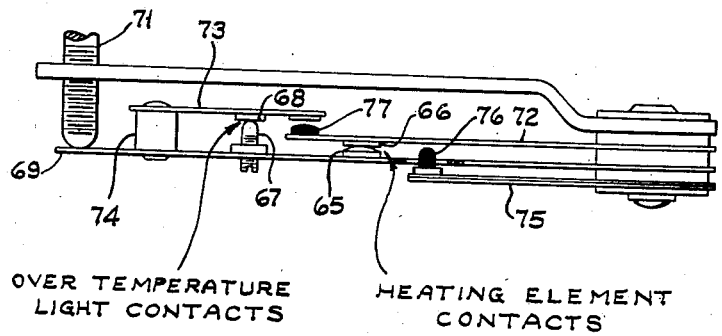
Fig. 7 is a side elevation of a modified form of thermostat in accordance with the invention.

In Fig. 7, I show a modified form of thermostat which extinguishes the light only upon overtemperature. This thermostat includes contacts 65 and 66 for controlling the heating element, and contacts 67 and 68 for extinguishing illumination upon overtemperature. The contacts 65 and 67 are mounted on a spring arm 69 which is sprung or self-biased upwardly against the lower end of a screw-threaded adjusting stem 71. Upon turning the stem 71, the spring arm 69 is raised or lowered for different temperature settings. The contact 66 is carried by a spring arm 72, while the contact 68 is carried by a spring arm 73 mounted on the spring arm 69 by means of a post 74. The spring arms 72 and 73 are self-biased downwardly. A bimetal strip 75 has an insulating button 76 adapted to engage the spring arm 72 upon sufficient upward movement of the bimetal strip 75. The spring arm 72 has an insulating button 77 adapted to engage the spring arm 73 upon sufficient upward movement.

The operation of this form of thermostat is as follows: At low temperature, the bimetal is in a lower position, and the spring arms 72 and 73 are both at the lowermost position to bring both sets of contacts into engagement. Thus, as soon as the cord is plugged in, the heating element is energized and the light is illuminated. Upon increase in temperature, the bimetal 75 bows upwardly and when the set temperature is reached, the button 76 moves the spring arm 72 upwardly, thereby moving the contact 66 out of engagement with the contact 65. Due to the lag in heat flow to the thermostat, the temperature imposed on the bimetal strip 75 tends to increase for a short time, causing further upward movement of the bimetal strip and the spring arm 72. The spring arm 73, however, is disposed sufficiently high that it is not engaged by the button 77 during such upward movement of the spring arm 72 during normal cycling operation. As the iron then cools, the bimetal strip 75 and the spring arm 72 move downwardly to bring the contacts 65 and 66 into engagement and to re-energize the heating element. There is again a lag in flow of heat from the heating element through the soleplate to the bimetal so the temperature of the bimetal continues to decrease for a short time and then as the temperature again increases the bimetal strip again moves upwardly to repeat the cycle.

It will be apparent that the higher the position of the spring arm 69, the higher is the temperature setting of the thermostat, since the bimetal 75 must move up further to open the heating element contacts.

Assume now that the iron has been adjusted to a relatively high temperature, such as 350° F., and that it is desired to iron a different type of material at 250° F. The stem 71 is turned to lower the spring arm 69 to a lower position. Due to the existing relatively high temperature, the bimetal 75 is bowed upwardly and holds the spring arm 72 at a relatively high position. Thus, when the spring arm 69 is lowered, the button 77 engages the spring arm 73 and causes the contact 68 to be disengaged from the contact 67 to extinguish the light. Thus, both heating element and light circuits are opened while the iron cools. As the iron cools to the upper limit of the temperature range suitable for ironing at the new setting, the button 77 lowers the spring arm 73 to bring the light contacts into engagement. The light is illuminated to indicate to the user that the iron is no longer too hot to use. Upon further decrease in temperature, the heating element contacts are brought into engagement to re-energize the heating element. The heating element contacts are now engaged and disengaged in the usual way to maintain the temperature of the iron within the temperature range to which the thermostat has been set, the light remaining continuously energized.

This form of the invention does not indicate to the user, upon initial heating up, when the iron is suitable for use. However, there is no danger of scorching the material being ironed, it merely requiring more time to do the ironing if the iron is not sufficiently hot. This form of thermostat, however, has the advantage that it indicates to the user that the cord has been plugged in and that the iron is heating up. It also retains the important indicating function of the first embodiment of indicating when the iron is above the temperature range for which the thermostat is suitable, thereby guarding against the danger of scorching of the material being ironed.

While the invention has been described and shown applied to an automatic, electrically heated flatiron, it is to be understood that the invention is not limited to this particular embodiment. It is within the purview of this invention to adapt the same to non-automatic flatirons, steam irons as well as dry irons, and irons heated electrically or otherwise. In other words the control of the iron temperature and the control of the combined signal and headlight may be independent. For example, the headlight and its thermostatically-controlled switch 49—50 or the equivalent thereof can be applied to a non-automatic iron in which the soleplate heater switch 26—27 is omitted and the energization of the soleplate heating element controlled in any suitable manner, as by a separate thermostat or a manual switch.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A flatiron including a soleplate, electrical heating means, a switch controlling energization of said heating means, means responsive to a temperature in said flatiron and operating said switch to deenergize said heating means upon rise above a predetermined temperature and to energize said heating means upon fall below substantially the same predetermined temperature, adjusting means for varying the predetermined temperature or temperatures at which said temperature-responsive means operates said switch, a lamp carried by the flatiron in such position as to illuminate the material to be ironed, a second switch comprising abutting contacts for controlling said lamp, and a lost motion connection between said temperature-responsive means and said second switch, said lost motion connection being constructed and arranged so that movement of said temperature-responsive means occasioned by variation in said temperature when normally cycling at any adjustment is within the lost motion provided by such connection and said second switch is closed and so that when said temperature-responsive means moves beyond the extent of said lost motion, said second switch is opened.

2. A flatiron having a soleplate, means for heating said soleplate, a thermostat responsive to the temperature of said soleplate, cooperating main contact means for controlling said heating means, a lamp carried by the flatiron in such position as to illuminate the material to be ironed, cooperating auxiliary contact means for controlling said lamp, and rockable means operable in one direction by said thermostat and in the other direction by one of said main contact means for controlling said auxiliary contact means.

3. A flatiron having a soleplate, means for heating said soleplate, a thermostat responsive to the temperature of said soleplate, cooperating main contact means for controlling said heating means, a lamp carried by the flatiron in such position as to illuminate the material to be ironed, cooperating auxiliary contact means for controlling said lamp, rockable means operable in one direction by said thermostat and in the other direction by one of said main contact means, means for biasing said rockable means to an intermediate normal position to close said auxiliary contact means, movement of said rockable means to one side or the other of said normal position by said thermostat or said one of said main contact means causing said auxiliary contact means to open.

4. A flatiron having a soleplate, means for heating said soleplate, a thermostat responsive to the temperature of said soleplate, cooperating main contact means for controlling said heating means, a lamp carried by the flatiron in such position as to illuminate the material to be ironed, cooperating auxiliary contact means for controlling said lamp, rockable means operable in one direction by said thermostat and in the other direction by one of said main contact means for respectively actuating the one or the other of said auxiliary contact means to an open position, and means for biasing said rockable means to an intermediate normal position to close said auxiliary contact means.

5. A flatiron having a soleplate, means for heating said soleplate, a thermostat responsive to the temperature of said soleplate, cooperating main contact means for controlling said heating means, a lamp carried by the flatiron in such position as to illuminate the material to be ironed, cooperating auxiliary contact means for controlling said lamp, rockable means operable in one direction by said thermostat and in the other direction by one of said main contact means for respectively actuating the one or the other of said auxiliary contact means to an open position, said main contact means opening and closing to maintain said soleplate within a predetermined temperature range without causing a rocking movement of said rockable means thereby to maintain said lamp illuminated whenever said soleplate temperature remains within said predetermined range.

6. A flatiron including a soleplate, an electric heating element therefor, a lamp carried by the flatiron in such position as to illuminate the material to be ironed, and a combined heating element and lamp control comprising a pair of main contacts for said heating element, a pair of auxiliary contacts for said lamp, a movable member on which one of said main contacts is carried, said member being operable, upon a predetermined movement in contact-opening direction after opening said main contacts, to effect opening of said auxiliary contacts, temperature-responsive means for controlling said contact-carrying member to effect opening of said main contacts and of said auxiliary contacts in response to a first predetermined temperature and a second higher predetermined temperature, respectively, and means for adjusting the relation of said temperature-responsive means to the other main contact and the auxiliary contacts for concurrently raising or lowering both of said predetermined temperatures, said predetermined movement of said contact-carrying member between opening of the main contacts and opening of the auxiliary contacts being constant for all temperature settings.

7. A flatiron including a soleplate, an electric heating element therefor, a lamp carried by the flatiron in such position as to illuminate the material to be ironed, and a combined heating element and lamp control comprising a pair of main contacts for said heating element, a pair of auxiliary contacts for said lamp, first and second arms carrying one of said main contacts and one of said auxiliary contacts, respectively, said second arm being biased in contact-closing direction, said first arm being operable, upon a predetermined movement in contact-opening direction after opening said main contacts, to actuate said second arm to open said auxiliary contacts, there being a lost motion between said arms sufficient to permit said predetermined movement of said first arm without actuating said second arm, temperature-responsive means actuating said first arm to effect opening of said main and of said auxiliary contacts in response to a first predetermined temperature and a second higher predetermined temperature, respectively, and adjusting means for adjusting the relation of said temperature-responsive means to the other main contact and to said second arm without changing the relation of said other main contact to said second arm, whereby said first and second predetermined temperatures are maintained in the same relation to each other at all temperature settings.

EARL K. CLARK.

REFERENCES CITED

The following references are of record in the file of this patent:

UNITED STATES PATENTS

| Number | Name | Date |
| --- | --- | --- |
| 1,393,968 | Rishel | Oct. 18, 1921 |
| 1,522,838 | Reh et al. | Jan. 13, 1925 |
| 2,208,432 | Samuels | July 16, 1940 |